Figure 12:
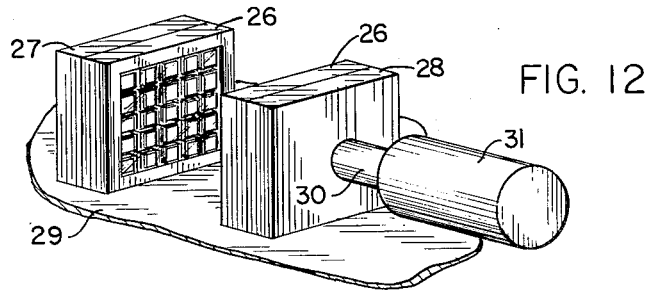

March 8, 1966  C. W. TRACY ETAL  3,238,682
COMPOSITE FLOOR AND PROCESS
Filed Dec. 23, 1963  2 Sheets-Sheet 1
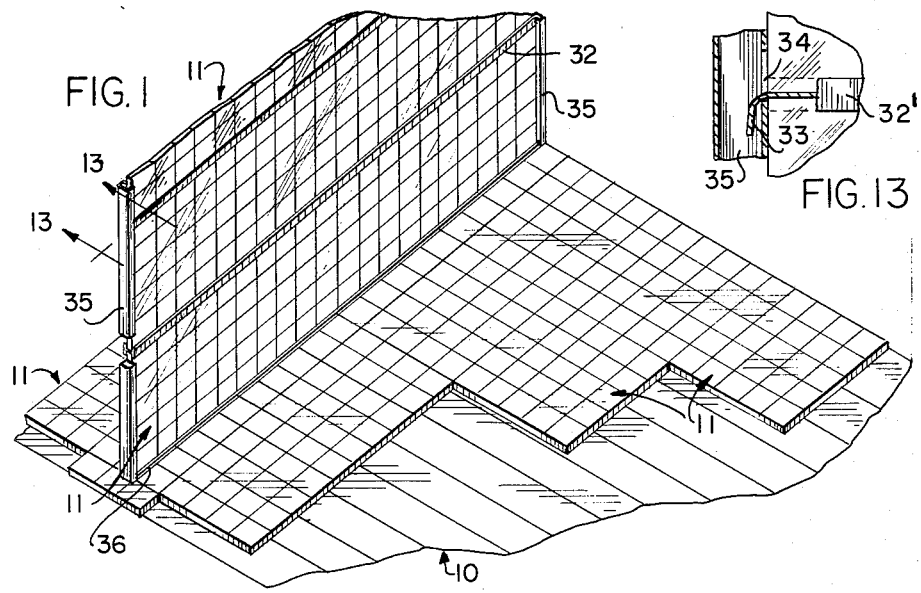
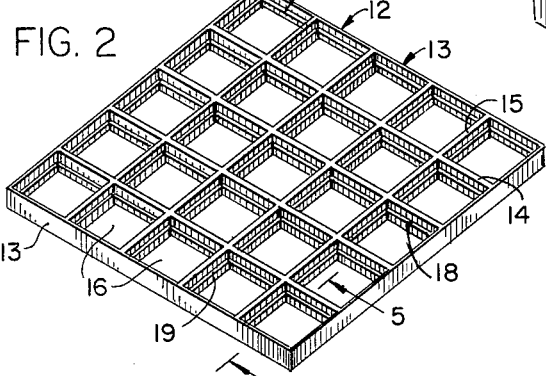
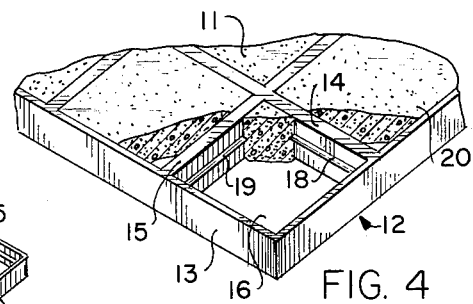
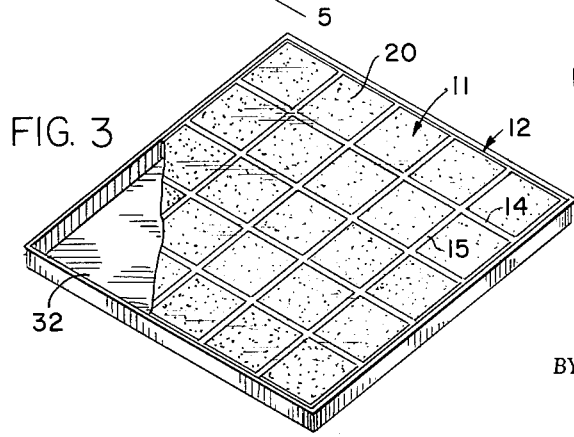
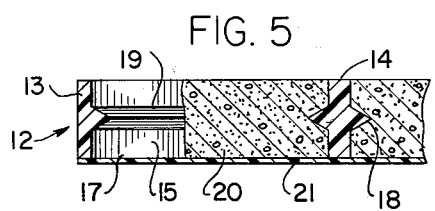
INVENTOR
CHARLES W. TRACY
CARTER H. BELVIN
RONALD C. TRACY
ATTORNEY March 8, 1966 C. W. TRACY ETAL 3,238,682
COMPOSITE FLOOR AND PROCESS
Filed Dec. 23, 1963 2 Sheets-Sheet 2

INVENTOR
CHARLES W. TRACY
CARTER H. BELVIN
RONALD C. TRACY

BY
ATTORNEY

United States Patent Office 3,238,682
Patented Mar. 8, 1966

3,238,682
COMPOSITE FLOOR AND PROCESS
Charles W. Tracy, Carter H. Belvin, and Ronald Charles Tracy, Tallahassee, Fla., assignors to Misceramic Tile, Inc.
Filed Dec. 23, 1963, Ser. No. 332,829
6 Claims. (Cl. 52—387)

This invention relates to floors, walls and other prepared surfaces in areas frequented by man, including the floors and walls of various rooms of homes and other habitable places having a terrazzo-like or other surface on a suitable base where a bright clean smooth and highly polished surface of attractive appearance is provided.

This invention relates particularly to a prefabricated terrazzo-like floor or wall composed of a combination of units each attached to a base of wood, masonry or the like and presenting and ground and polished terrazzo-like surface, instead of a terrazzo floor of the kind heretofore produced on location, and the invention relates also to a method of producing or manufacturing such prefabricated units.

It has been the custom in the production of terrazzo floors to provide a solid base beneath the area on which the floor was to be constructed and to top-surface such base with a masonry mixture and then to smooth and polish such surface all on location. Construction of floors in this manner has been expensive since it has been necessary to have materials and workmen at the place of installation and to perform all the work at such location as well as to allow substantial drying time and with workmen interfering or being interfered with by other workmen, all resulting in the use of more labor and time than was necessary.

It is an object of the invention to provide a terrazzo-like floor or wall surface in a minimum of time and at a substantial saving in the amount of material, labor and time consumed when compared to the laying of terrazzo floors in the conventional manner, and to provide a method of manufacturing or producing the same that results in a substantial reduction in cost.

Another object of the invention is to provide a preformed masonry floor or wall unit which can be combined with others to provide a floor or wall, each unit having a terrazzo-like surface, which floor or wall can be quickly laid on a subsurface of wood, masonry, or other substance, and resulting in a tiled surface composed of tile units that have been ground and polished at the time of manufacturing, each tile being composed of a plastic grid having a generally horizontal retention rib and with such grid provided with a masonry tile-forming filler including independently introduced particles of selective sizes and colors to provide a desired effect.

A further object of the invention is to provide a preformed terrazzo-like surfacing tile which can be readily laid and attached to a subsurface of wood, masonry, or other substance and which preformed tile is composed of a grid of slight yieldability, the cells of which define a series of holders of smaller size for masonry tile-forming fillers of any desired shape and color, the marginal walls of the grid being half as thick as the remaining walls, and which tile may have break lines to facilitate the breakage of the tile and with such tile unit having a hard polished top finish and a thin barrier forming and protecting bottom surface, and providing a finished unit which can yield to slight warping of the subflooring without cracking the overlying terrazzo-like floor.

Figure 6:
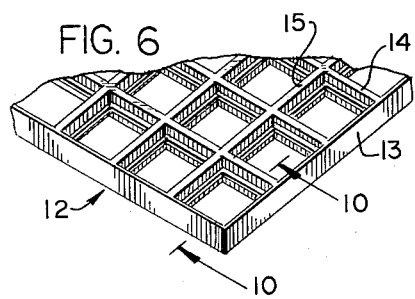
Figure 10:
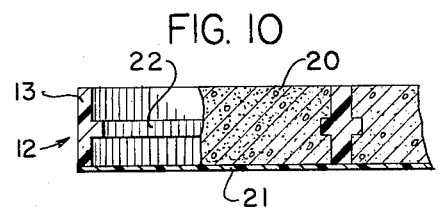
Figure 9:
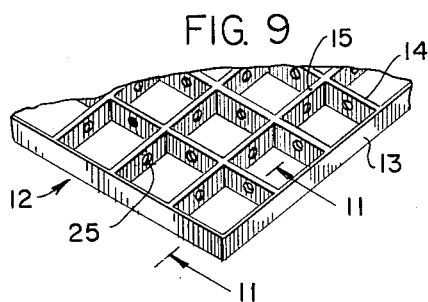
Figure 11:
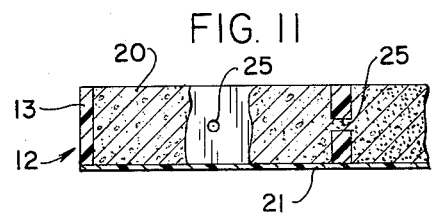

Other objects and advantages of the invention will be apparent from the following description taken in conjunction with the accompanying drawings in which:

FIG. 1 is a fragmentary perspective of a portion of a floor or wall including subsurfacing and a panel wall all using the prefabricated surfacing tile of the present invention;

FIG. 2, a perspective of a plastic grid in which the masonry filler is received;

FIG. 3, a perspective of the plastic grid and masonry filler which constitutes the prefabricated tile unit with the metal tray which serves as a holder for the grid while the filler is being poured and ground and polished;

FIG. 4, a fragmentary perspective of one corner of the tile unit of FIG. 3 with a portion of the masonry removed to reveal details of construction;

FIG. 5, a section on the line 5—5 of FIG. 2;

FIGS. 6, 7, 8 and 9, fragmentary corner perspectives of grids having slightly different forms of masonry filler retaining means;

FIGS. 10 and 11, sections on the lines 10—10 and 11—11 of FIGS. 6 and 9, respectively;

FIG. 12, an exploded perspective illustrating dies for producing the grid; and,

FIG. 13, a detailed perspective of the joint between the supporting bars and the upright posts of the wall panel.

Briefly stated the invention is a terrazzo-like floor, wall, or panel and method of manufacturing the same, the floor and walls being composed of a subsurface of wood, masonry, or other material, on which is secured a surface of multiple preformed tile units each including a preformed grid composed of a boundary or encompassing wall or rim and subdividing walls defining generally honeycomb type cells open from side to side of the grid but smaller in the center and of increasing size toward each side of the grid, and providing generally hourglass construction serving to lock the grid and masonry filler together. In other words, the configuration of the center of the walls of the grid, regardless of whether provided with openings or projections, is such that when a flowable filler is introduced into the grid and allowed to harden, there is an intimacy which serves to lock the filler and the grid together. The grid preferably is composed of a relatively tough slightly yieldable substance which may be of a plastic capable of being produced by injection molding with a press having cooperative dies the surface portions smaller than the more remote portions for interlocking, and when the masonry filler is supplied the grid and filler preferably are vibrated to cause complete filling and the elimination of voids within the cells, and the tile units otherwise can be prepared and ground and polished at the place of manufacture ready for distribution and installation on location wherever desired and in any desired manner, as, for example, in a floor or wall by an adhesive, or in a panel or screen by other holding means, and when installed can conform to slight changes in contour of the supporting structure, the bounding walls of the grid being half as thick as the internal walls permitting the tiles to be installed with abutting grid walls of the same thickness as the intermediate grid walls for appearance.

With continued reference to the drawings the present invention contemplates the production of a terrazzo-like or other surface on a floor, wall, or panel by the addition of prefabricated units to provide the desired surface.

In the production of a floor or wall a base may be provided having a subsurface 10 of any desired character including wood for ease and readiness of construction, and on which multiple surfacing tile units 11 are adapted to be mounted and secured. Each tile unit is composed of a preformed grid 12 constructed of slightly yieldable, frangible material and having a boundary wall or rim 13 and transverse walls 14 and 15 forming cells 16 which are open at both sides of the grid. The rim or boundary 13 and partition walls 14 and 15 which define the cells are provided intermediate their outer edges with projecting portions 17, 18 and 19, all of which decrease in thickness from base to apex, which reduce the central area of the cells generally in the form of an hourglass serving to lock together the filler 20 and grid 12.

The masonry filler 20 of any desired composition, with or without ornamentation, is introduced into the grid in any desired manner, the grid first having been placed in a tray 32 with a supporting rim for the grid so that the masonry filler can be introduced above and tamped or vibrated until it completely fills the several cells of the grid eliminating voids, whereupon it is leveled and allowed to harden and thereafter it is ground and polished on one or both surfaces until it has the desired finish, the grid serving as a guide or screed during the grinding operation. The masonry filler may incorporate independent particles of sizes and colors to give the finished surface the desired color character and such form of particles may be of artistic character such as marble or other substance from distant lands.

To the back of the unit thus prepared may be applied a protective coating 21 to form a barrier for moisture, termites or the like. The thus fabricated tile unit with its ground and polished surface is adapted to be laid with other tile to provide a surface for a floor or wall and to be fastened in place with cement, adhesive or the like.

After preparing the subsurface 10 of wood, masonry or other substance, a mastic, adhesive or bonding agent is applied and the preformed tiles 11 are laid to cover the area of the floor desired. Since the surfaces of the tiles already are ground and polished a floor is provided which does not require further grinding and polishing. In view of the nature of the preformed tile structures, after they are laid or in place and bonded to the subsurface they will compensate for slight warping or other variations in the floor.

The rim or marginal portion 13 of the tile is of a thickness of half of that of the cross members 14 and 15. Consequently when the tiles are laid the thickness of the abutting marginal walls 13 will be equal to the thickness of the other members 14 and 15 so that all of the lines in the tile will be of equal thickness. In applying the tile units to a base, when the space to be covered is less than the complete tile unit, a unit may be broken along the lines of the grid so that a small tile segment may be utilized to fill a space instead of a complete unit.

Figure 7:
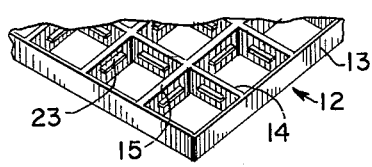
Figure 8:
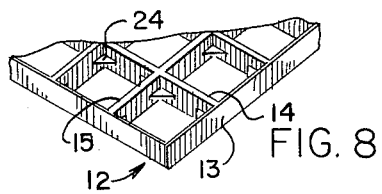

Instead of having a grid 12 in which the cells are provided with a central rib which tapers from base to apex, a square type rib 22 (FIGS. 6 and 10) may be provided, or a shorter type of rib 23, as illustrated in FIG. 7, or a corner type of rib 24, as illustrated in FIG 8, may be used, or instead of the projection type lock-in construction the grid may have inner seal defining walls provided with openings 25 (FIGS. 9 and 11) through which the filler can flow between cells to provide the lock-in arrangement. The disadvantage of the use of openings in the partitions betweens the cells is that this may require a separate operation in the manufacture of the tile.

Grids of the character indicated, except for the openings 25 of FIG. 9, may be produced by injection molding using cooperating dies 26 smaller at their surfaces than at their remote portions to provide the grid and filler interlock. The dies are provided with backing members 27 and 28, the backing member 27 being mounted in fixed relation to a base 29 and the backing member 28 being attached to the end of the piston 30 within a cylinder 31 so that when the dies are brought together with the plastic injected therebetween each of the two dies will make half of a complete grid.

The tile units of the floor and wall in which there is a subsurface are constructed to yield and compensate for slight inequalities in the subsurfacing without a crack or break and the invention contemplates a relatively simple process by which the tiles may be manufactured in any desired variation in the ornamental appearance. It is also contemplated that the tile panels may serve as screens, room dividers, or in any other desired manner.

The present invention is directed not only to a composite floor or wall but to a panel or screen any of which may be readily constructed by the use of the prefabricated tile units of the present invention. In the production of a panel as illustrated in FIG. 1 the tile units may be ground and polished on both surfaces and may be supported by I-beam type bars 32' into which the upper and lower edges of the tiles are received, the ends of said bars 32' having hooks 33 which extend through slots 34 in posts 35. If desired a bar 36 of generally U-shaped construction may be provided adjacent the floor to support the edges of the lowermost tiles.

It will be obvious to those skilled in the art that various changes may be made in the invention without departing from the spirit and scope thereof and therefore the invention is not limited by that which is illustrated in the drawings and described in the specification but only as indicated in the accompanying claims.

What is claimed is:

1. A prefabricated tile comprising a preformed yieldable, multi-sided, frangible grid having a boundary wall of predetermined height and thickness, a series of partition-forming walls connecting opposed side portions of said grid and defining a plurality of open cells, said partition-forming walls being substantially twice the thickness of said boundary walls, a hardenable masonry filler having terrazzo-like surfaces completely filling each cell, at least certain of said walls having means located out of the plane of the wall cooperatively engaging said filler, and at least one surface of said filler and grid being relatively smooth, said tile being adapted to be adhered to a supporting surface with said smooth surface outermost and the grid abutted against the grids of adjacent tiles in such a manner that the combined boundary walls will be of substantially the same thickness as said partition walls.

2. The structure of claim 1 in which said means located out of the plane of the walls includes projections located intermediate the heights of said walls.

3. The structure of claim 1 in which said means located out of the plane of the walls includes an opening through the wall so that the filler of one cell is positively connected to the filler of at least one adjacent cell.

4. The structure of claim 1 in which said filler includes independent particles of artistic character.

5. The structure of claim 1 including a moisture and termite-proof barrier on the surface opposite said smooth surface.

6. The structure of claim 1 in which said tile is generally rectangular and adapted to be broken along at least one of said partition-forming walls.

(References on following page)

References Cited by the Examiner

UNITED STATES PATENTS

| | | | |
|---|---|---|---|
| 178,308 | 6/1876 | Leathers et al. | 50—271 |
| 400,996 | 4/1889 | Belden | 94—12 |
| 636,200 | 10/1899 | Frink | 50—339 |
| 1,505,642 | 8/1924 | Henry | 94—6 |
| 1,619,734 | 3/1927 | Jeppson et al. | 264—71 |
| 1,741,745 | 12/1929 | Thompson | 94—16 X |
| 1,807,715 | 6/1931 | Tucker | 20—6 |
| 1,931,713 | 10/1933 | Walper | 50—404 X |
| 2,018,711 | 10/1935 | Elmendorf | 20—6 X |
| 2,203,932 | 6/1940 | Taylor | 94—3 X |
| 2,239,529 | 4/1941 | Knudsen | 50—389 X |
| 2,550,627 | 4/1951 | Walter | 264—34 |
| 2,748,592 | 6/1956 | Kelly | 50—404 X |
| 2,777,789 | 1/1957 | Smith | 20—6 |
| 2,852,932 | 9/1958 | Cable | 50—338 |
| 3,025,772 | 3/1962 | Palatini | 94—4 |
| 3,070,866 | 1/1963 | Kastenbein. | |
| 3,125,831 | 3/1964 | Marsch | 264—261 X |

FOREIGN PATENTS

| | | |
|---|---|---|
| 225,715 | 11/1959 | Australia. |
| 68,281 | 11/1948 | Norway. |

JACOB L. NACKENOFF, *Primary Examiner.*